(12) United States Patent
Barlow et al.

(10) Patent No.: US 6,743,507 B2
(45) Date of Patent: Jun. 1, 2004

(54) CELLULOSE FIBER REINFORCED COMPOSITES HAVING REDUCED DISCOLORATION AND IMPROVED DISPERSION AND ASSOCIATED METHODS OF MANUFACTURE

(75) Inventors: Fred Barlow, St. Simons Island, GA (US); Yash Khanna, Brunswick, GA (US); Daren B. Pietsch, St. Simons Island, GA (US); John Underwood, St. Simons Island, GA (US)

(73) Assignee: Rayonier Products and Financial Services Company, Fernandina Beach, FL (US)

( * ) Notice: Subject to any disclaimer, the term of this patent is extended or adjusted under 35 U.S.C. 154(b) by 0 days.

(21) Appl. No.: 10/165,502

(22) Filed: Jun. 7, 2002

(65) Prior Publication Data

US 2003/0228454 A1 Dec. 11, 2003

(51) Int. Cl.[7] .................................................. D02G 3/00
(52) U.S. Cl. ................. 428/393; 428/292.1; 428/297.4; 428/300.1; 428/364; 428/375; 428/378; 428/392; 428/394
(58) Field of Search ............................ 428/292.1, 297.4, 428/300.1, 364, 375, 308.8, 378, 392, 393, 394, 395

(56) References Cited

U.S. PATENT DOCUMENTS

| | | |
|---|---|---|
| 4,131,577 A | 12/1978 | Lachowicz et al. |
| 5,187,202 A | 2/1993 | Walkowski |
| 5,858,522 A | 1/1999 | Turk et al. |
| 6,270,883 B1 | 8/2001 | Sears et al. |

OTHER PUBLICATIONS

Database WPI Section Ch, Week 199846, Derwent Publications Ltd., London, GB; Class A17, AN 1998–537574 XP002254416 & JP 10 237206 A (Central Glass Co., Ltd.) Sep. 8, 1998.

*Primary Examiner*—Merrick Dixon
(74) *Attorney, Agent, or Firm*—Alston & Bird LLP

(57) ABSTRACT

The present invention provides composites prepared from melt blending compositions that generally include cellulosic pulp fibers having an alpha-cellulose purity of greater than 80% by weight, at least one water soluble binder, at least one lubricant, at least one compatibilizer, and at least one matrix polymer. The present invention further provides advantageous temperature profiles and feeding arrangements to be used in conjunction with the melt blending of such composites. The composites of the present invention exhibit reduced discoloration and improved fiber dispersion.

41 Claims, 2 Drawing Sheets

CELLULOSE FIBER REINFORCED COMPOSITES HAVING REDUCED DISCOLORATION AND IMPROVED DISPERSION AND ASSOCIATED METHODS OF MANUFACTURE

FIELD OF THE INVENTION

This invention relates to composite materials containing cellulosic pulp fibers dispersed in a polymeric matrix. The invention also relates to methods by which to produce such composites and molded articles therefrom.

BACKGROUND OF THE INVENTION

Composites are widely used in a broad spectrum of applications, including automotive parts, sporting goods, computer chips, and the like. Composites are generally defined as a macroscale combination of two or more solid components that are insoluble in each other and which further differ in chemical nature. More particularly, composites typically include at least one reinforcing component enveloped in a matrix composition. The reinforcement generally bears the load to which the composite is subjected, while the matrix transfers the load between the reinforcing elements. An interface is formed between the reinforcement and the matrix. It is the adhesion between the two constituents at this interface which determines the mechanical properties of the composite as a whole. In fact, adhesion is responsible for the generally synergistic nature of composites. For example, the adhesion developed within composites can provide mechanical properties that are generally superior to the mechanical properties of the individual elements, either alone or in combination. In addition to mechanical properties, composites possessing adequate adhesional characteristics can also provide other physical properties, such as conductivity, notched impact resistance, and the like, which are superior to the sum of the properties of the individual components. A number of factors impact the adhesion developed within composites, including the dispersion of the reinforcement component within the matrix and the level of compatibility between the reinforcement and the various components which make up the matrix compositions. Coatings may be applied to the reinforcement to promote adhesion, such as the acrylate graft copolymers described in U.S. Pat. No. 4,131,577. However, there nevertheless remains in the art a need for composites exhibiting improved adhesion. There further remains a need in the art for composites having other improved propeties, such as color and the like. A variety of polymers, both thermoset and thermoplastic, commonly serve as the basis for the matrix composition. Thermoplastic polymers are particularly attractive for use in matrices, due to their ease of processability. Well known thermoplastic matrix materials include polyamides, such as nylons, polyesters, and polyolefins, particularly polypropylene. Polypropylene is a particularly attractive matrix material for applications requiring performance at low to moderate temperatures because it is relatively inexpensive and light weight, yet provides adequate physical properties. Consequently, polypropylene is regularly used as the matrix polymer in automotive composites, such as injection molded interior parts and the like.

Numerous fibrous materials are similarly known for use as reinforcements in composites. Glass fibers are particularly widely used as the reinforcing component for composites, imparting increased mechanical strength, dimensional stability, and heat resistance to the final composite. However, although glass fibers achieve desirable reinforcing properties, they are fairly costly, abrade processing equipment and increase the overall density of the composite. In certain applications, these disadvantages outweigh the advantages of using glass fibers as a reinforcement component.

Cellulosic materials have been evaluated as fibrous reinforcements for composites in the past. Klason, et al., "Cellulosic Fillers for Thermoplastics", Polymer Composites, (1986); Klason, et al., "The Efficiency of Cellulosic Fillers in Common Thermoplastics. Part 1. Filling without processing aids or coupling agents", Intern. J. Polymeric Mater., Volume 10, pgs. 159–187 (1984); Snijder, et al., "Polyolefins and Engineering Plastics Reinforced with Annual Plant Fibers", The Fourth International Conference on Wood Fiber-Plastic Composites, pg. 181–191.

Cellulosic materials are especially attractive for use in composites because they have relatively low densities. For example, cellulose fibers have a density of approximately 1500 $kg/m^3$ in comparison to a density of 2500 $kg/m^3$ for E grade glass fibers. Such weight savings can be highly advantageous, particularly in automotive applications. In addition to the reduction in weight, cellulosic fibers are not abrasive to processing equipment in comparison to glass fibers or high density mineral fibers, e.g. wollastonite.

However, prior investigations into the use of cellulosic materials, e.g. cellulose pulps or raw lignocellulosic resources (e.g., wood flour, bagasse), in polymeric materials found that a pronounced discoloration of the composite material occurred if the cellulose materials were processed at elevated temperatures, such as the temperatures commonly employed when melt blending the reinforcement and matrix. Furthermore, cellulosic materials were found to cause significant off-gasing and objectionable odors. These disadvantageous results directed previous research efforts to the use of cellulosic materials in matrix polymers having more moderate melting temperatures, such as melting temperatures of below 200° C. Further, the use of cellulosic fibers having higher alpha-cellulose contents has been proposed in conjunction with higher melting matrix polymers, as discussed in U.S. Pat. No. 6,270,883 hereby incorporated by reference in its entirety.

However, despite such research efforts, discoloration continues to be problematic in conventional cellulosic material-reinforced composites prepared from matrices having even moderate melting temperatures. For example, an undesirable brownish discoloration is observed in conventional composites formed from cellulose fibers dispersed in a polyolefinic matrix. As noted above, this brownish discoloration is generally associated with the degradation of the cellulose fibers during processing and often gives rise to malodors during product usage. Further, an unacceptable level of fiber agglomeration has been observed in conventional cellulosic fiber/polyolefin composites to date. As noted previously, such agglomeration would be expected to be detrimental to the interfacial adhesion characteristics of the composite, thus negatively impacting mechanical properties and the like. Further, agglomeration of the cellulosic fibers can give rise to surface roughness and non-uniform properties. Consequently, a need exists in the art for cellulose-reinforced composites having improved color and dispersion properties.

BRIEF SUMMARY OF THE INVENTION

The present invention provides improved cellulosic fiber reinforced composites and methods by which to form such composites. More specifically, the present invention provides cellulosic fiber reinforced composites having a beneficial balance of matrix components selected to impart improved color and fiber dispersion characteristics to the resulting composite. The present invention further provides methods by which to produce cellulosic fiber reinforced composites having superior color and fiber dispersion in comparison to known cellulosic material reinforced composites.

The cellulosic fiber reinforced composites of the present invention further provide improved structural characteristics to the matrix material at a reduced cost in comparison to conventional glass fibers and with a much lower increase in the density of the resulting composite. The cellulosic pulp fibers employed in the composites of the invention also do not significantly abrade the processing equipment or generate malodors during composite manufacture. Additionally, the use of the cellulosic pulp materials according to the invention allows for the blending of the components and molding of the resultant composite material at lower processing temperatures.

In one advantageous embodiment, cellulose reinforced composites are provided that are prepared from a melt blending composition that includes: cellulosic pulp fibers having an alpha-cellulose purity of greater than about 80% by weight; at least one olefinic matrix polymer; at least one water soluble binder; at least one lubricant; and at least one compatibilizer. Exemplary water soluble binders include polyacrylamide, sodium carboxymethyl cellulose polyvinyl alcohol, polyethylene glycol and mixtures thereof. Exemplary lubricants for use in the present invention include silicone oil, ethylene bisstearamid, metal stearates, fatty acid amides, and mixtures thereof. In one beneficial embodiment, the lubricant is a mixture of silicone oil and ethylene bisstearamid. Exemplary compatibilizers for use in the invention include maleated polypropylene, maleated co- or ter-polymers of ethylene and mixtures thereof. Suitable olefinic matrix polymers include polypropylene, polyethylene, polybutene, polyisobutene, poly(methyl pentene), copolymers thereof, terpolymers thereof and mixtures thereof. The melt blending composition may further include at least one coupling agent selected from silanes, titanates, zirconates, and mixtures thereof.

Another aspect of the invention provides processes for the manufacture of composites containing cellulosic pulp fibers dispersed in an olefinic matrix polymer. Such processes generally include introducing a melt blending composition into the main feed throat of a compounding extruder and transporting the melt blending composition through at least three heated regions and a heated die within the extruder, in which an initial region of the compounding extruder is heated to a temperature of about 10 percent below the matrix polymer melting point; a first intermediate region of the compounding extruder, which may constitute a major region of the extruder, is heated to a temperature of about 15 to 20 percent below the matrix polymer melting point; a second intermediate region of the compounding extruder, e.g., a small region immediately preceding the die, is heated to a temperature of about 15 to 20 percent above the matrix polymer melting point; and the die is heated to a temperature of about 35 to 40 percent above the matrix polymer melting point. In further beneficial aspects, an additional amount of olefinic matrix polymer is introduced into a secondary feed throat of the compounding extruder positioned downstream of the main feed throat. In additional advantageous embodiments of these aspects, the olefinic matrix polymer introduced into the secondary feed throat possesses a melt flow index that is substantially lower than the melt flow index of the olefinic matrix polymer introduced into the main feed throat.

The present invention further provides molded articles prepared from melt blending compositions including cellulosic pulp fibers having an alpha-cellulose purity of greater than about 80 percent by weight; at least one water soluble binder; at least one lubricant; at least one compatibilizer; and at least one matrix polymer. Molded articles in accordance with the present invention include injection molded articles, compression molded articles, blow molded articles, rotational molded articles, extruded articles and pultruded articles.

Further understanding of the processes and systems of the invention will be understood with reference to the drawings and detailed description which follows herein.

BRIEF DESCRIPTION OF THE DRAWINGS

Figure 1:
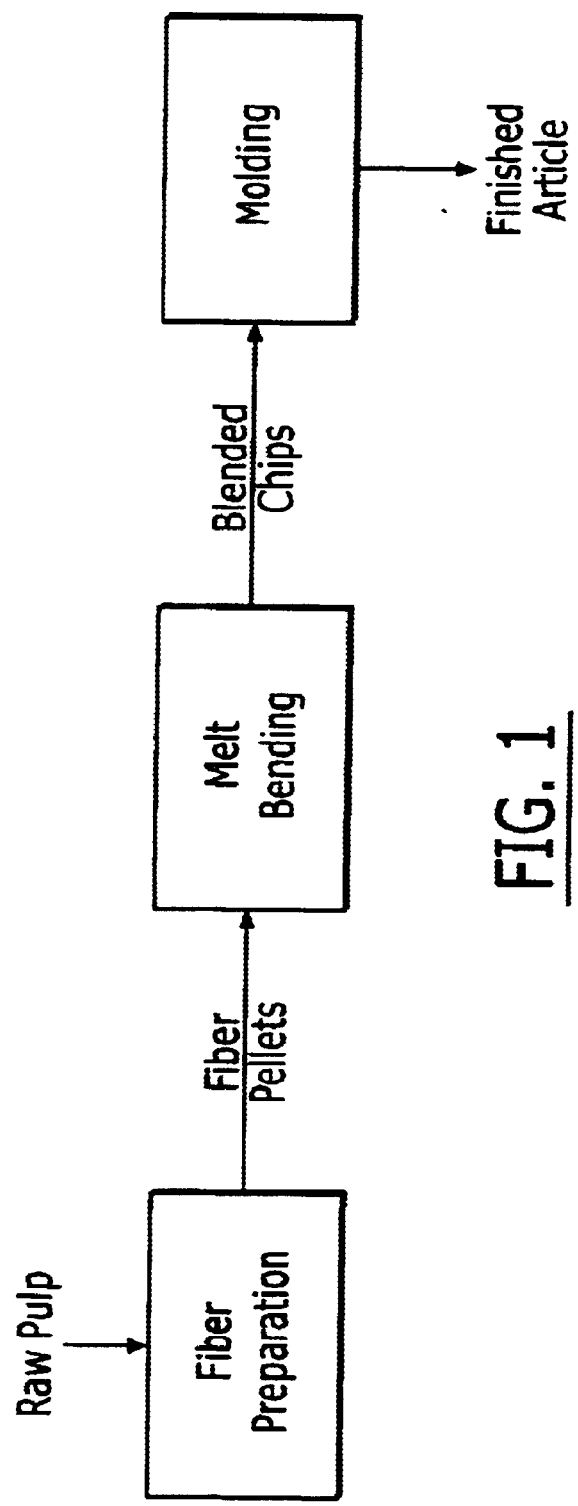

Having thus described the invention in general terms, reference will now be made to the accompanying drawings, which are not necessarily drawn to scale, and wherein:

FIG. 1 represents a flow diagram of a typical manufacturing process used to prepare articles in accordance with one embodiment of the present invention.

Figure 2:
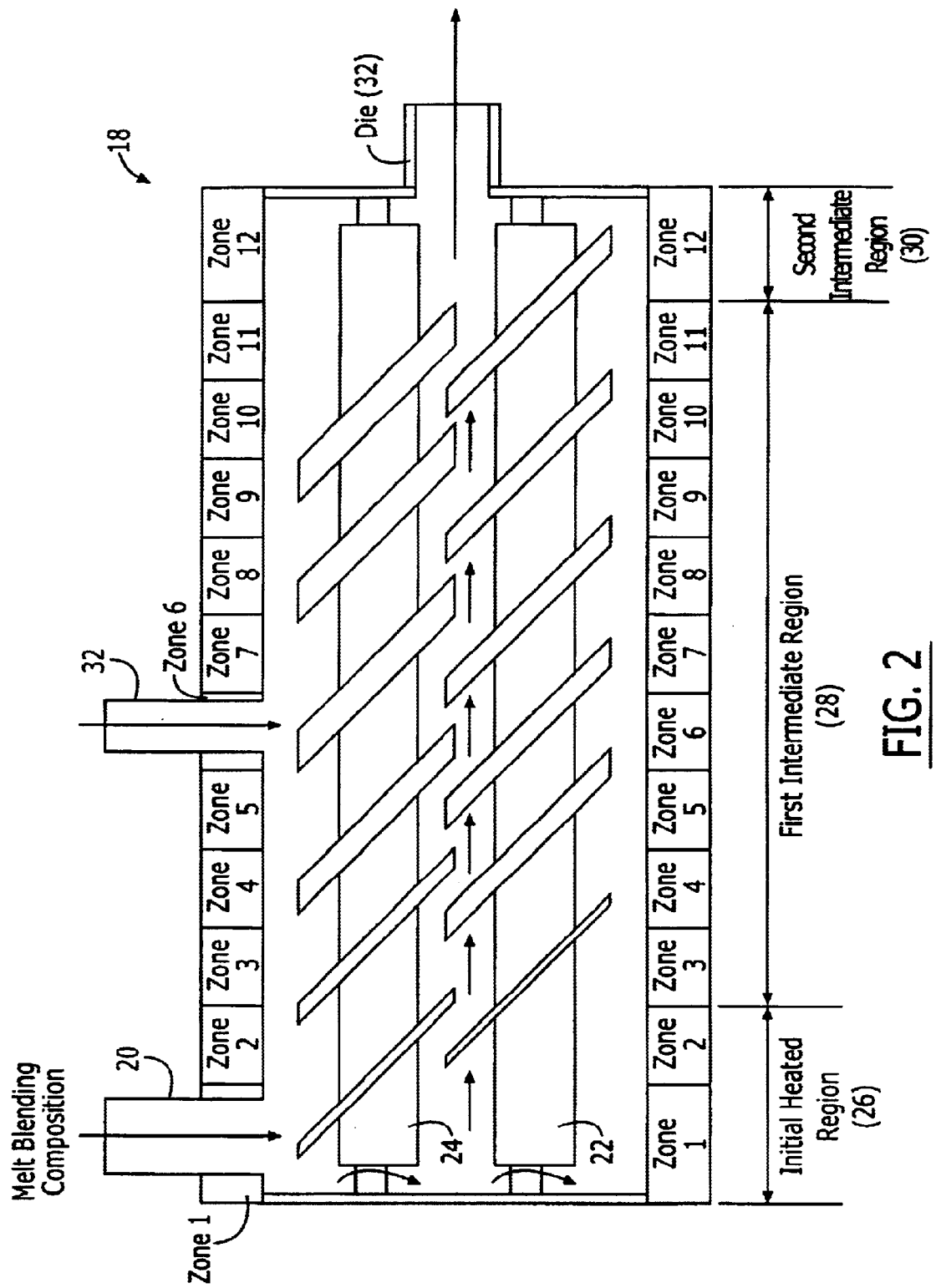

FIG. 2 is a schematic drawing of a compounding extruder in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention relates to cellulose reinforced composites formed from cellulosic pulp fibers that are dispersed in a matrix composition that generally includes at least one matrix polymer, at least one water soluble binder, at least one lubricant, and at least one compatibilizer.

As noted previously, the cellulosic pulp fibers impart reinforcing properties to the composites of the invention. The cellulosic pulp fibers generally exhibit an alpha-cellulose purity of greater than about 80% by weight. In advantageous embodiments, the cellulosic pulp fibers may have an alpha-cellulose purity greater than about 90% by weight. In further beneficial aspects of these embodiments, the cellulosic pulp fibers may have an alpha-cellulose content of greater than about 95% by weight, such as an alpha-cellulose content of greater than about 96% by weight, and advantageously greater than about 98%.

The cellulosic pulp fibers may further beneficially possess low amounts of residual lignin. For example, the cellulosic pulp fibers can have a lignin content less than about 2% by weight, such as lignin contents of less than about 1% by weight or less than about 0.5% by weight.

Exemplary cellulosic pulps from which to extract fibers include TERRACEL™-10J, ULTRANIER™-J, RAYFLOC™-J-LD, POROSANIER™-J-HP, ETHENIER™-F-UHV, SULFATATE™-H-J-HD and PLACETATE™-F pulps, each of which are commercially available from Rayonier, Performance Fibers (Jesup, Ga.). All of these pulps have an alpha-cellulose purity of about 95% or greater with the exception of RALFLOC™-J, which has alpha-cellulose content of about 86%. All are softwood pulps with the exception of TERRACEL™-10J and SULFATATE™-H-J which are manufactured from hardwood fibers. The PLACETATE™ and ETHENIER™ grades are sulfite pulps whereas the others are kraft pulps.

Further exemplary cellulosic pulps include ESTER-CELL™ and VISCOCELL™ (International Paper--Natchez, Miss.), SUPERSOFT™ (International Paper--Texarkana, Tex.), BORREGMRD UHV-S™ (Borregaard, Sarpsborg, Norway), SAICCOR ACETATE™ and SAICCOR VISCOSE™ (Saiccor-Umkomass, South Africa), Weyerhaeuser MAC II™ (Weyerhaeuser, Cosmopolis, Wash.), Buckeye A-5™ and Buckeye COTTON LINTERS™ (Buckeye Technologies--Perry, Fla. and Memphis, Tenn., respectively).

The cellulosic pulp fibers may be derived from either a softwood pulp source or hardwood pulp source or mixtures thereof. Exemplary softwood pulp sources include trees such as various pines (Slash pine, Loblolly pine, White pine, Caribbean pine), Western hemlock, various spruces, (e.g., Sitka Spruce), Douglas fir and/or mixtures of same. Exemplary hardwood pulp sources include trees such as sweet gum, black gum, maple, oak, eucalyptus, poplar, beech, and aspen or mixtures thereof.

The cellulosic pulp fibers may be of any length that is sufficient to impart suitable reinforcing properties to the resulting composite. In advantageous embodiments, the cellulosic fibers are characterized by an average length, e.g., a weighted average fiber length ("WAFL") length, between about 0.1 to 6 mm. In advantageous aspects of the invention the average fiber length is around 0.8 mm. In alternative beneficial aspects, the cellulose fibers are characterized by an average length of about 1.8. Advantageously, the cellulosic pulp fibers of the present invention are not coated with a graft copolymer.

The composite typically includes from about 1% to 75% by weight cellulosic pulp fibers, such as between about 10 to 75% by weight cellulosic fibers. In beneficial embodiments, the composites of the present invention include less than about 60% by weight cellulosic pulp fibers, such as composites including less than about 40% by weight cellulosic pulp fibers. In advantageous aspects of these beneficial embodiments the composites of the present invention include cellulosic pulp fibers in an amount of about 30 to 35% by weight.

The matrix composition generally includes a number of components, including at least one matrix polymer. Any thermoplastic polymer exhibiting a melting temperature of less than about 200° C. may advantageously be employed as the matrix polymer. Melting temperatures of less than about 200° C. are particularly common for olefinic polymers. Exemplary olefinic polymers for use as the matrix polymer include polypropylene, polyethylene, poly (1-butene), polyisobutene, poly (1-pentene), poly(3-methyl-1-pentene), poly (4-methyl-1-hexene), poly (5-methyl-1-hexene), copolymers thereof, terpolymers thereof, and mixtures thereof. As used herein, the term "polyethylene" includes high density, medium density, low density, linear low density, ultra high density and medium low density polyethylene. Advantageously, the olefinic matrix polymer may be polypropylene, polyethylene or a mixture thereof. In an alternative embodiment, the thermoplastic polymer may be polyamide 11, polyamide 12 or a mixture thereof. Polyamide 11 and polyamide 12 have melting points of 186° C. and 177° C., respectively.

The melt flow index of the olefinic polymer, e.g. polypropylene, is generally selected to provide acceptable processability. For example, the olefinic polymer melt flow index may typically range from about 0.1 to 100. In advantageous aspects, the melt flow index of the olefinic matrix polymer can range from about 10 to 25, such as a melt flow index ranging from about 10 to 12. In further beneficial aspects of the invention, higher molecular weight olefinic matrix polymers may be employed, such as olefinic polymers exhibiting a melt flow index ranging from about 4.0 to 35.

In alternative embodiments, the olefinic matrix polymer may include a mixture of polymer having different melt flow indices. In such embodiments, a first portion of the olefinic matrix polymer may possess a relatively high melt flow index, such as a melt flow index ranging from about 30 to 90, while a second portion of the olefinic matrix polymer may exhibit a significantly lower melt flow index, such as a melt flow index ranging from about 10 to 25. In beneficial aspects, the melt flow index of the first portion may range from about 50 to 80, and more specifically from about 70 to 80. In further advantageous aspects, the melt flow index of the second portion may range from about 10 to 12. The mixture of olefinic polymer having different melt flow indices may further be a mixture of the same type of olefinic polymer, e.g. a mixture of lower and higher melt indices polypropylene, or different types of olefinic polymers, e.g. a mixture of higher melt index polypropylene and lower melt index polyethylene.

The composite typically includes from about 25% to 99% by weight matrix polymer, such as between about 25 to 70% by weight matrix polymer. In beneficial embodiments, the composites of the present invention include more than about 50% by weight matrix polymer, such as composites including more than about 40% by weight matrix polymer. In advantageous aspects of these beneficial embodiments the composites of the present invention include matrix polymer in an amount of about 65 to 70% by weight.

The matrix composition may further include at least one water soluble binder. The water soluble binder generally provides integrity to the cellulose pulp fibers during intermediate processing stages (as will be described in greater detail below). The water soluble binder is further believed to aid in dispersing the cellulosic pulp fibers within the matrix polymer. Any polymer having sufficient hydrophilicty to impart water solubility and exhibiting a molecular weight ranging from about $50 \times 10^3$ to $25 \times 10^6$ Daltons, may be employed. Exemplary water soluble binders include a variety of polymers, such as polyacrylamide, polyacrylic acid, polyvinyl alcohol, polyethylene glycol, and poly(n-vinylpyrroliddinone) and mixtures thereof. Further suitable water soluble binders include salt substituted celluloses, such as sodium carboxymethyl cellulose, sodium hydroxyethylcellulose, sodium carboxymethylhydroxyethylcellulose, sodium hydroxypropylcellulose and the like, as well as mixtures thereof.

Although not wishing to be bound by any theory, applicants hypothesize that thermoplastic water soluble binders may provide both improved thermal stability during composite manufacture and greater compatibility with the cellulose pulp fibers in comparison to cellulose based water soluble binders. Applicants further theorize that the combination of increased thermal stability and greater compatability provided by water soluble binders may impart better color and fiber dispersion to the resulting composite. Consequently, in beneficial aspects of the invention thermoplastic water soluble binders are employed. In one advantageous embodiment of these aspects, polyacrylamide is employed as the water soluble binder.

The water soluble binder may be present in any amount effective to provide adequate integrity to the cellulosic fibers during processing and/or to impart adequate dispersion properties. For example, the water soluble binder may beneficially be present within the composite in amounts ranging from about 0.01 to 3 weight percent, such as in amounts ranging from about 0.01 to 2.0 weight percent based on the weight of the cellulosic pulp fibers. In advantageous embodiments, the water soluble binder is present in the composite in an amount of about 0.5 weight percent, based on the weight of the cellulosic pulp fibers.

Advantageously, the water soluble binder is capable of producing high viscosity solutions. The water soluble binder is typically characterized by a molecular weight in excess of 50,000. In one advantageous aspect of the invention, the water soluble binder exhibits a molecular weight of about $15 \times 10^6$ daltons.

The water soluble binder may optionally include an effective amount of a softener, such as a non-ionic surfactant. The softener is believed to act as a debonding agent to facilitate the dispersion of the pulp fiber mass. One exemplary softener is BEROCELL™ 509, commercially available from Eka Chemicals, Paper Chemicals Division. The softener may be included in exemplary amounts ranging from about 0.1 to 2.0% weight percent, based on the weight of the cellulose pulp fiber. In one beneficial embodiment, the softener is present in an amount of about 0.5 weight percent, based on the weight of the cellulose pulp fiber.

The matrix composition may further include at least one lubricant. The lubricant is generally believed to provide improved fiber dispersion within the composite, as well as reduced discoloration via reduced frictional degradation during compounding. Although not wishing to be bound by theory, Applicants hypothesize that the lubricant, and potentially the water soluble binder decreases the number of fiber clumps within the composite. For example, the cellulosic pulp fibers of the invention may advantageously be dispersed substantially evenly throughout the entire composite. This reduction in cellulose fiber clumping will require less shear energy during composite manufacture, thereby contributing to the improved color and dispersion properties of the present invention. Such improved fiber dispersion would further be expected to provide more uniform properties, such as mechanical properties and the like, across the cross section of the resulting composite. However, although believed to impart a host of beneficial properties to the present invention, lubricants are generally considered to be detrimental to adhesion. More specifically, lubricants are known for use as release agents to eliminate the adhesion between surfaces. Consequently, it is altogether unexpected that the inclusion of suitable amounts of lubricants enhance the optical and fiber dispersion characteristics of the present invention without substantial detriment to the remaining physical properties.

Any compound which is compatible with both the matrix polymer and cellulosic fibers, is thermally stable during composite processing and further provides lubricating properties to the fibers may be employed as the lubricant. The lubricant advantageously exhibits minimal weight loss, e.g. less than 5%, at temperatures of up to about 260° C. Exemplary lubricants include silicone oil, fatty amides, such as ethylene bisstearamid and oleyl palmitamide, metal sterates and mixtures thereof. In one advantageous embodiment, silicone oil is employed as the lubricant. In an alternative advantageous embodiments, the lubricant is a mixture of silicone oil and a fatty amide. More particularly, the lubricant may beneficially be a mixture of silicone oil and ethylene bisstearamid, such as mixture including silicone oil and ethylene bisstearamid in about a 2:1 weight ratio.

In beneficial embodiments liquid lubricants are employed, as it is hypothesized that liquid lubricants can be better dispersed throughout the fiber bundles. The lubricants may also beneficially have a molecular weight ranging from about 10,000 to 80,000 daltons. In advantageous embodiments of these aspects, lubricants characterized by a molecular weight ranging from about 15,000 to 60,0000 daltons, such as lubricants exhibiting a molecular weight of about 30,000 to 50,000 daltons, may be employed. In more specific beneficial embodiments of the invention, lubricants including silicone oil exhibiting such molecular weight ranges are employed.

The lubricant may be present in any amount sufficient to impart adequate dispersion and/or release properties to the resulting composite. In advantageous embodiments, the lubricant is present in an amount ranging from about 0.3 to 5.0 weight percent, such as an amount ranging from about 0.3 to 3.0 weight percent, based on the weight of the composite. In one aspect of these embodiments, the lubricant is present in an amount of about 1.0 weight percent, based on the weight of the composite.

A compatibilizer may also be incorporated into the matrix compositions of the present invention. Although not wishing to be bound by theory, the compatiblizer is believed to improve the adhesion between the matrix polymer and the cellulosic fibers by reducing the hydrophilic/hydrophobic differences which exist between them. Applicants have thus determined that certain compounds may act as bridging agents between the cellulosic reinforcing fibers and hydrophobic matrix polymers. Applicants further hypothesize that specific compounds may have greater compatibility within specific matrix polymer/cellulose fiber combinations.

Any compound providing suitable adhesive properties to the resulting composite may be employed as a compatibilizer. Exemplary compatibilizers include maleated polypropylene and maleated copolymers or terpolymers of ethylene and mixtures thereof. In beneficial aspects of the invention, maleated polypropylene is employed, particularly in conjunction with olefinic matrix polymers. One exemplary maleated polypropylene includes about 99% polypropylene and 1% maleic anhydride polymer. One maleated polypropylene suitable for use in the present invention is commercially available as POLYBOND™ 3200 from Crompton Corporation.

The compatibilizer may be present within the cellulose reinforced composite in any amount effective to provide sufficient bonding between the cellulose pulp fibers and the matrix polymer. Suitable amounts of compatibilzer include amounts ranging from about 0.1 to 5 weight percent, based on the weight of the composite. In advantageous embodiments, the compatibilizer may be incorporated into the cellulose-reinforced composite in an amount of about 2 weight percent, based on the weight of the composite.

One or more coupling agents may also be included within the matrix composition. Exemplary coupling agents include titanates, zirconates, silanes, and mixtures thereof. In one advantageous embodiment, the coupling agent is derived from silane. The coupling agent may typically be included in the composite in amounts ranging from about 0.1 to 5 weight percent, based on the weight of the composite. In advantageous embodiments, the coupling agent may be incorporated into the cellulose-reinforced composite in an amount of about 2 weight percent, based on the weight of the composite.

One or more antioxidants may also be included within the matrix composition. Exemplary antioxidants include hindered phenols and mixtures thereof. Exemplary antioxidants include Irgafos 168 from Ciba Geigy and Naugard B25 from Uniroyal Chemical. The antioxidant may typically be included in the matrix composition in amounts ranging from about 0.1 to 0.3 weight percent, based on the weight of the composite. In advantageous embodiments, the antioxidant may be incorporated into the cellulose-reinforced composite in an amount of about 0.3 weight percent, based on the weight of the composite.

FIG. 1 schematically illustrates the typical three step process used to produce articles in accordance with the present invention. The process generally includes a fiber preparation step, a melt blending step and a molding step. The primary purpose of the fiber preparation step is to transform the cellulosic pulp fibers into a form suitable for feeding into the compounding extruder for melt blending with the matrix composition. The melt blending step is generally used to disperse the separated fibers within the matrix composition. A molding step is then typically used to impart a suitable three dimensional shape to the composite.

As used herein, the term "composite" refers to the intermediate composite exiting the melt blending step, although the finished article exiting the molding step could similarly be characterized as a "composite," as both contain reinforcing fibers dispersed in a matrix composition. Consequently, for the sake of clarity, the intermediate composite may be referred to at times as "blended chip" and the subsequent molded product may be referred to at times as an "article" within the remainder of the specification.

As noted above, the primary purpose of the fiber preparation step is to produce cellulosic pulp fibers in a form suitable for melt blending with the matrix polymer. Commercial cellulosic pulps are typically available as either cut sheets or sheet rolls. Consequently, to facilitate feeding and blending of the fibers with the matrix polymer, the incoming cellulose pulp fibers need to be of a form that can be efficiently fed into the extruder and melt blended with the matrix polymer. Pelletization and granulation are methods to produce suitable forms of cellulose pulp fibers for this use. In order to properly pelletize or granulate cellulose pulp fibers, separate individual fibers or small aggregates of fibers are required. Separate individual fibers or small aggregates of fibers may be obtained either prior to sheeting the cellulose pulp fibers or by defiberizing sheeted material.

Granulation is generally performed using a rotary knife cutter to break up the cellulosic pulp fibers within the incoming pulp sheets or rolls. Unfortunately, the granulation process typically reduces the average fiber length. This decreased cellulose fiber length typically translates into decreased physical properties in the resulting composite.

In an alternative embodiment, the cellulose pulp fibers may be provided as discrete cellulosic pulp fibers or fiber bundles by capturing the fibers prior to the typical sheeting and drying operations. These discrete cellulosic pulp fibers can be efficiently formed into pellets that are easily handled in subsequent processes. Pelletizing processes preserve the fiber length, and hence mechanical properties, to a much greater extent than granulation processes. Cellulosic fibers exiting a pelletizing process typically have an average fiber length ranging between about 0.8 to 2.5 mm. The pelletizing process generally produces fiber pellets comprised of cellulosic pulp fibers that are cohesively bound by a suitable amount of at least one water soluble binder, such as the water soluble polymers described above. The fiber pellets provide the cellulosic pulp fibers in a form that may then be readily fed into the compounding extruder and mixed with the matrix composition during melt blending.

Pelletization may be accomplished by any means known in the art. In one advantageous embodiment, a mixer, such as a Hobart mixer or a pug mill, may be used to initially disperse the water soluble binder with the cellulosic fibers. A pelletizer, such as a Kahl pelletizing mill, may then be used to form cylindrical fiber pellets. Typical fiber pellets range from about 3 to 8 mm in diameter with a length of about 3 to 9 mm. The fiber pellets typically have a density of around 0.6 g/cm$^3$. The fiber pellets provide improved material handling properties and easier feeding characteristics for the melt blending operation.

Advantageously, the dried fiber pellets should have a moisture content less than about 5% by weight, such as a moisture content of less than about 1 % by weight, and further be substantially free of solvent. Consequently, the fiber pellets may beneficially be dried prior to melt blending.

As shown in FIG. 1, the cellulosic pulp fibers exiting the fiber preparation step are transported to a melt blending step. During melt blending, the cellulose pulp fiber pellets are separated into discrete fibers and are dispersed, or compounded, within the matrix composition. Melt blending is typically accomplished by introducing a melt blending composition including the cellulosic pulp fiber pellets, matrix polymer, and any additional matrix composition components into a compounding extruder. Any compounding extruder providing suitably aggressive mixing, such as a co-rotating twin screw extruder, may be used to compound the melt blending composition. An exemplary compounding extruder is schematically illustrated in FIG. 2.

As indicated in FIG. 2, at least a portion of the melt blending composition is introduced into a compounding extruder 18 through a main feed throat 20. The melt blending composition generally includes the cellulosic pulp fiber (advantageously in the form of fiber pellets containing a suitable binder component), the matrix polymer, at least one lubricant, and at least one compatibilizer, as well as the other optional additives described above. Following its introduction, the melt blending composition is transported down the length of two co-rotating parallel screws 22, 24, passing through several distinct regions of high temperature and/or pressure where the polymeric matrix is melted and blended with the reinforcing fiber and other matrix components prior to exiting the extruder through a heated die 32. Each of the heated regions may be formed from one or more temperature controlled zones. In one advantageous embodiment, the melt blending composition is transported through at least three heated regions 26, 28, 30 and a heated die 32 during compounding. Upon exiting the heated die 32, the compounded melt blending composition is quenched and then chopped or otherwise formed into blended chips which are suitable to be used in a subsequent molding process.

In the advantageous embodiment represented in FIG. 2, the compounding extruder 18 further includes a secondary feed throat 34 for introducing either a secondary portion of one or more components of the melt blending composition or other additives downstream of the main feed throat The secondary feed throat 34 may generally be positioned anywhere downstream of the main feed throat. In the advantageous embodiment depicted in FIG. 2, the secondary feed throat 34 is positioned about half way between the main feed throat 20 and the heated die 32.

Applicants have found that melt blending compositions incorporating high alpha cellulose pulp fibers may be processed at extruder setting temperatures below the melting point of the matrix polymer, as described in U.S. Pat. No. 6,270,883. Applicants have further determined that a particular skewed parabolic heating profile may be used in the compounding extender 18 to impart less discoloration during melt blending without negatively impacting the resulting fiber dispersion properties. More specifically, Applicants have determined that melt blending compositions including cellulosic pulp fibers having an alpha-cellulose purity of greater than 80% by weight may be beneficially compounded by passing the melt blending composition sequentially through an initial region 26 heated to a temperature about 10% below the matrix polymer melting point, a first intermediate region 28 heated to a temperature of about 15 to 20 percent below the matrix polymer melting point, a second intermediate region 30 heated to a temperature of about 15 to 20 percent above the matrix polymer melting point, and a die 32 heated to a temperature of about 35 to 40 percent above the matrix polymer melting point.

The foregoing skewed parabolic heating profile has been determined to be particularly advantageous in conjunction with olefinic matrices. For example, in advantageous embodiments employing polypropylene as the matrix polymer, whose melt temperature typically ranges between 160 to 165° C., the initial region 26 may be heated to a temperature ranging between about 125 to 145° C., the first intermediate region 28 may be heated to a temperature ranging between about 115 to 135° C., the second intermediate region 30 may be heated to a temperature ranging between about 160 to 190° C., and the die 32 may by heated to a temperature ranging between about 190 to 220° C.

In beneficial embodiments, compounding can be performed in a compounding extruder having 12 heated zones, typically of approximately equal length and diameter, followed by a heated die. In such beneficial embodiments, the initial heated region 26 may encompass the first two heated zones, the first intermediate region 28 may encompass the third through eleventh heated zones, and the second intermediate region 30 may encompass the twelfth heated zone, as illustrated in FIG. 2.

The compounding extruder may be of any size and may be capable of any throughput known in the art for use in melt blending processes. In one advantageous embodiment, a 40 mm compounding extruder is employed which is capable of at least about 400 lbs/hour throughput. Extruders suitable for use in the present invention are commercially available from a number of manufacturers, including Coperion Corporation.

Applicants have further determined that the feeding protocol used to introduce the matrix polymer into the melt blending step may also impact fiber dispersion properties. More specifically, Applicants have determined that feeding a first portion of the matrix polymer through the main feed throat 20 and a second portion of the matrix polymer through a secondary feed throat 34 positioned downstream of the main feed throat 20 and upstream of the second intermediate heated region 30 can result in improved fiber dispersion within the blended chips.

For example, to produce blended chips containing approximately 30% cellulosic pulp fiber, an initial melt blending composition containing a cellulosic fiber to matrix polymer weight ratio ranging from about 40:60 to 80:20 may be introduced into the main feed throat 20 and the remaining matrix polymer required to dilute the initial melt blending composition down to 30% cellulosic fiber may be introduced into the secondary feed throat 34. In alternative aspects of this embodiment, blended chips containing 30% cellulosic pulp fiber may be prepared from initial melt blending compositions containing from about 40:60 to 70:30 cellulosic fiber to matrix polymer weight ratios, such as initial melt blending compositions containing from about 45:55 to 60:40 cellulosic fiber to matrix polymer weight ratios. In one particularly beneficial embodiment, an initial melt blending composition containing an about 55:45 cellulosic fiber to matrix polymer. weight ratio is employed to make blended chips containing about 30% cellulosic pulp fiber.

In additional beneficial aspects, Applicants have determined that discoloration may be further reduced by feeding a first portion of the matrix polymer having a fairly low viscosity, e.g. a comparatively high melt flow index, through the main feed throat 20 of the compounding extruder 18 and a second portion of the matrix polymer having a higher viscosity, e.g. a comparatively low melt flow index, through a secondary feed throat 34 positioned downstream of the main feed throat 20. For example, Applicants have determined that discoloration may be reduced by feeding a first portion of the matrix polymer having a melt flow index ranging from about 30 to 90, such as a melt flow index ranging between about 50 to 80 or about 70 to 80, into the main feed throat 20 of the compounding extruder 18. A second portion of matrix polymer having a melt flow index ranging from about 10 to 25, such as a melt flow index ranging from about 10 to 12, may then be introduced through a secondary feed throat 34 positioned downstream of the main feed throat 20 and upstream of a second intermediate heated region, as shown in FIG. 2. The amount of lower viscosity matrix polymer introduced into the main feed throat 20, i.e. the first polymer portion, may generally vary from about 5 to 80 weight percent of the total amount of the matrix polymer. In further beneficial aspects of these embodiments, the first polymer portion may constitute from about 20 to 40 weight percent of the total amount of the matrix polymer.

Returning now to FIG. 1, the blended chips exiting the melt blending process may advantageously be formed into complex three dimensional articles by molding and the like. Molding compositions in accordance with the present invention may include the blended chips alone or in combination with additional amounts of the same or different matrix polymer. Further, additional additives known in the molding arts may be included within the molding composition, as well. As used herein, the term "molding" is meant to encompass any process in which heat and pressure is applied to the blended chips to transform them into more complex three dimensional articles. Exemplary molding operations thus include injection molding, compression molding, blow molding and rotational molding, as well as various extrusion and pultrusion processes. Molded articles formed in accordance may define fairly complex three dimensional objects, such as objects defining multiple sharp corner radii and the like. One advantageous embodiment of the present invention comprises injection molding the blended chips into complex finished articles, such as molded products employed within the automotive industry and the like.

The present invention will be further illustrated by the following non-limiting examples.

EXAMPLE I

Fiber Pellet Formation

Preparation of Sample 1 Fiber Pellets:

TERRACEL™-10J fibers in wet fibrous form (water content between 50 and 60%, based on weight of the wet fibers) were mixed in a Hobart mixer with sodium carboxymethyl cellulose ("CMC"), commercially available as Na-CMC-7H4F from Hercules Aqualon Division. The weight ratio of dry fiber to CMC was 100 to 0.5. After blending in a Hobart mixer, the cellulose fiber/CMC mixture was fed to a Kahl pelletizing mill to form cylindrical pellets. The Kahl Pellet Mill employed was a Type L175 mill, commercially available from Amandus Kahl Nachf., Hamburg, Germany. The pellet mill, operating at discharge rates ranging between 0.1 to 0.3 kg/min, produced fiber pellets exhibiting a moisture content of about 50 to 60%. The fiber pellets were subsequently dried overnight at 190° F. The fiber pellets generally had a diameter ranging from about 3 to 8 mm and a length ranging from about 3 to 9 mm. The fiber pellet density was around 0.6 g/cm$^3$. After pelletizing, Kajanni fiber length measurements determined that the WAFL of the fiber pellets was around 1.8 mm.

Preparation of Sample 2 Fiber Pellets:

A second set of fiber pellets were prepared by combining TerraCel™ 10J fibers with 0.5 wt % (based on the weight of the cellulose fiber) polyacrylamide ("PAM") having a molecular weight of 15×106 daltons and 1 wt % (based on the weight of the cellulose fiber) lubricant mixture using the mixing and pelletizing equipment and conditions described for Sample 1. The PAM was obtained from Aldrich Chemicals. The lubricant mixture was comprised of 67 wt % (based on the weight of the lubricant mixture) SF96-350 silicone oil from GE Silicones and 33 wt. % (based on the weight of the lubricant mixture) ethylenebisstearamid ("EBS"), commercially available from Aldrich Chemicals.

Melt Blending of Sample 1 and 2 Fiber Pellets:

The fiber pellets identified as Samples 1 and 2 were melt blended with polypropylene exhibiting a Melt Flow Index ("MFI") of about 12. The polypropylene employed in Sample 2 was produced by Basell and obtained via Federal Plastics Corporation, Cranbury, N.J. A comparable polypropylene was used to form Sample 1. The melt blending composition further included maleated polypropylene, commercially available as POLYBOND 3200 from Crompton Corporation, as a compatibilizer, in an amount of about 2 weight percent, based on the weight of the melt blending composition. The fiber to polypropylene weight ratio within the melt blending composition was 30:70.

The compounding extruder was a 40 mm co-rotating twin-screw extruder with 12 heated barrel zones and heated die made by Coperion Corporation, formerly Werner-Pfleiderer. A throughput rate of 200 lbs/hour was maintained throughout the melt blending process. The temperature profile employed during melt blending was: zones 1–2 at 142° C.; zones 3–11 at 133° C.; zone 12 at 176° C., and die at 210° C.

The results obtained from the melt blending of Samples 1 and 2 are provided in Table 1 below:

TABLE 1

| Sample | Fiber Pelletization Additives | Yellowness[1] | Fiber Dispersion[2] |
|---|---|---|---|
| 1 | 0.5% CMC | 3 | Bad |
| 2 | 0.5% PAM + 1.0% Si Oil/EBS | 1 | Very Good |

[1]Based on AATCC Gray Scale for evaluating difference in color, in which a value of 1 indicates white and a value of 5 indicates a dark tan shade.
[2]Based on visual observation of the uniformity of fiber dispersion after molding the blended chips into a thin film.

As shown in Table 1, qualitative comparisons between Samples 1 and 2 indicate that a fiber pelletization additive package of 0.5% PAM and 1% Si oil/EBS produced a lighter color and better dispersion in melt blended chips than 0.5% CMC alone. A visual inspection of a small amount of blended chip containing 0.5% PAM without 1.0% Si Oil/EBS similarly indicated that PAM provides superior color and fiber dispersion results in comparison to CMC, although sufficient sample was not available for a more detailed analysis. Further, Sample 2 exhibited superior color and fiber dispersion characteristics in comparison to PAM alone.

EXAMPLE II

Preparation of Sample 3:

Additional fiber pellets based on 0.5% CMC were formed using the materials and procedures described in Example I for Sample 1. The fiber pellets were subsequently melt blended with polypropylene in a 55:45 fiber pellet to matrix polymer weight ratio, using the polypropylene, equipment, and processing conditions described in Example I, except that a sufficient amount of polypropylene having a MFI of about 12 was added to the compounding extruder in a secondary feed throat downstream of the main feed throat to produce a final composition within the blended chips produced in Sample 3 of 30% celluose pulp fiber and 70% polypropylene.

The results obtained from the melt blending of Samples 1 versus 3 are provided in Table 2 below:

TABLE 2

| Sample | Fiber/PP Ratio at Main Feeder | Fiber Dispersion[1] |
|---|---|---|
| 3 | 55:45 | Very Good |
| 1 | 30:70 | Bad |

[1]Based on visual observation of the uniformity of fiber dispersion after molding the blended chips into a thin film.

Fiber ratios higher than 55:45 did not improve the dispersion anymore. Based on a comparison of Samples 1 and 3, the use of a fiber to polypropylene weight ratio of about 55:45 at the main feed throat produced the best dispersion properties.

EXAMPLE III

Preparation of Sample 4:

Fiber pellets were formed and subsequently melt blended using the materials, equipment, and processing conditions described in Example II for Sample 3, except that the melt flow index of the polypropylene mixed with the fiber pellets at the main feed throat ranged from about 70 to 80.

The results obtained from the melt blending of Samples 3 versus 4 are provided in Table 3 below:

TABLE 3

| Sample | Fiber/PP Ratio at Main Feeder | Fiber Dispersion[1] |
|---|---|---|
| 3 | 12 | Very Good |
| 4 | 70–80 | Excellent |

[1]Based on visual observation of the uniformity of fiber dispersion after molding the blended chips into a thin film.

Based on a comparison of Samples 3 and 4, the use of a higher MFI, i.e., lower molecular weight PP, in the melt blending composition supplied to the main feed throat led to a lighter color and improved fiber dispersion within the resulting blended chip.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed That which is claimed:

1. A cellulose reinforced composite prepared from a melt blending composition comprising:
cellulosic pulp fibers having an alpha-cellulose purity of greater than about 80% by weight;
at least one matrix polymer exhibiting a melting temperature of less than about 200° C.;
at least one water soluble binder;
at least one lubricant; and
at least one compatibilizer.

2. A cellulose reinforced composite according to claim 1, wherein said cellulosic pulp fibers have an alpha-cellulose purity greater than about 90% by weight.

3. A cellulose reinforced composite according to claim 1, wherein said cellulosic pulp fibers have an alpha-cellulose purity greater than about 98% by weight.

4. A cellulose reinforced composite according to claim 1, wherein said cellulosic pulp fibers have a lignin content less than about 2% by weight.

5. A cellulose reinforced composite according to claim 1, wherein said cellulosic pulp fibers have an average length between about 0.1 and 6 mm.

6. A cellulose reinforced composite according to claim 1, wherein said at least one water soluble binder is a water soluble polymer selected from polyacrylamide, polyacrylic acid, poly(n-vinyl pyrroliddinone), sodium carboxymethyl cellulose, polyvinyl alcohol, polyethylene glycol, sodium hydroxy ethyl cellulose, sodium carboxy methyl hydroxy ethyl cellulose, sodium hydroxy propyl cellulose and mixtures thereof.

7. A cellulose reinforced composite according to claim 1, wherein said at least one water soluble binder is polyacrylamide.

8. A cellulose reinforced composite according to claim 1, wherein said at least one water soluble binder is present in an amount of about 0.01 to 3.0 weight percent, based on the weight of the cellulosic pulp fibers.

9. A cellulose reinforced composite according to claim 1, wherein said at least one water soluble binder exhibits a molecular weight of about $15 \times 10^6$ daltons.

10. A cellulose reinforced composite according to claim 1, wherein said at least one lubricant is selected from silicone oil, fatty amides and metal stearates, and mixtures thereof.

11. A cellulose reinforced composite according to claim 10, wherein said fatty amides are selected from ethylene bisstearamid and oleyl palmitomide.

12. A cellulose reinforced composite according to claim 1, wherein said at least one lubricant is silicone oil.

13. A cellulose reinforced composite according to claim 12, wherein said silicone oil exhibits a molecular weight ranging from about 10,000 to 80,000 daltons.

14. A cellulose reinforced composite according to claim 12, wherein said silicone oil exhibits a molecular weight ranging from about 30,000 to 50,000 daltons.

15. A cellulose reinforced composite according to claim 12, wherein said lubricant is a mixture further comprising ethylene bisstearamid.

16. A cellulose reinforced composite according to claim 15, wherein said silicone oil is present at about a 2:1 weight ratio in comparison to said ethylene bisstearamid.

17. A cellulose reinforced composite according to claim 1, wherein said at least one lubricant is present in an amount ranging from about 0.3 to 5.0 weight percent, based on the weight of the composite.

18. A cellulose reinforced composite according to claim 1, wherein said compatibilizer is selected from maleated polypropylene, maleated ethylene co- and terpolymers and mixtures thereof.

19. A cellulose reinforced composite according to claim 1, wherein said compatibilizer is maleated polypropylene.

20. A cellulose reinforced composite according to claim 1, wherein said compatibilizer is present in an amount of about 0.1 to 5.0 weight percent, based on the weight of the composite.

21. A cellulose reinforced composite according to claim 1, wherein said at least one matrix polymer is selected from polypropylene, polyethylene, poly (1-butene), polyisobutene, poly (1-pentene), poly(3-methyl-1-pentene), poly (4-methyl-1-hexene), poly (5-methyl-1-hexene), copolymers thereof, terpolymers thereof, and mixtures thereof.

22. A cellulose reinforced composite according to claim 1, wherein said at least one matrix polymer is polypropylene.

23. A cellulose reinforced composite according to claim 1, wherein said at least one matrix polymer exhibits a Melt Flow Index ranging from about 0.1 to 100.

24. A cellulose reinforced composite according to claim 1, wherein said at least one matrix polymer exhibits a Melt Flow Index of about 4 to 35.

25. A cellulose reinforced composite according to claim 1, wherein said at least one matrix polymer exhibits a Melt Flow Index of about 10 to 25.

26. A cellulose reinforced composite according to claim 1, wherein said matrix polymer includes a first portion of said matrix polymer exhibiting a Melt Flow Index ranging from about 10 to 25 and a second portion of said matrix polymer exhibiting a Melt Flow Index ranging from about 30 to 90.

27. A cellulose reinforced composite according to claim 24, wherein said second portion is present in an amount ranging from about 5 to 80 weight percent, based on the weight of the composite.

28. A cellulose reinforced composite according to claim 25, wherein said second portion is present in an amount ranging from about 20 to 40 weight percent, based on the weight of the composite.

29. A cellulose reinforced composite according to claim 1, wherein said matrix polymer is present in an amount ranging from about 25 to 99 weight percent, based on the weight of the composite.

30. A cellulose reinforced composite according to claim 1, wherein said cellulosic pulp fibers are present in an amount ranging from about 1 to 75 weight percent, based on the weight of the composite.

31. A cellulose reinforced composite according to claim 1, wherein said cellulosic pulp fibers are present in an amount of about 30 to 35 weight percent, based on the weight of the composite.

32. A cellulose reinforced composite according to claim 1, wherein said melt blending composition further includes at least one coupling agent selected from titanates, zirconates, silanes and mixtures thereof.

33. A cellulose reinforced composite according to claim 1, wherein said coupling agent is a silane.

34. A cellulose reinforced composite according to claim 1, wherein said coupling agent is present in an amount ranging from about 0.1 to 5 weight percent, based on the weight of the composite.

35. A cellulose reinforced composite according to claim 1, wherein said melt blending composition further includes at least one antioxidant.

36. A cellulose reinforced composite according to claim 34, wherein said antioxidant is derived from a hindered phenol.

37. A cellulose reinforced composite according to claim 34, wherein said antioxidant is present in an amount ranging from about 0.1 to 0.3 weight percent, based on the weight of the composite.

38. A cellulose reinforced composite prepared from a melt blending composition comprising:

cellulosic pulp fibers having an alpha-cellulose purity of greater than 80% by weight;

a water soluble binder comprising polyacrylamide;

a matrix polymer comprising polypropylene;

a lubricant mixture comprising silicone oil and ethylene bisstearamid; and a compatibilizer comprising maleated polypropylene.

39. A cellulose reinforced composite according to claim 38, wherein said cellulosic pulp fibers having an alpha-cellulose purity of greater than 80% by weight are present in an amount ranging from about 10 to 75 weight percent;

said water soluble binder is present in an amount ranging from about 0.5 to 3.0 weight percent;

said lubricant mixture is present in an amount ranging from about 0.3 to 2.0 weight percent; and said compatibilizer is present in an amount ranging from about 2.0 to 5.0 weight percent.

40. Molded articles prepared from a melt blending composition comprising:

cellulosic pulp fibers having an alpha-cellulose purity of greater than about 80 percent by weight;

at least one water soluble binder;

at least one lubricant;

at least one compatibilizer; and at least one matrix polymer.

41. An injection molded article according to claim 40, wherein said molded articles are selected from injection molded articles, compression molded articles, blow molded articles, rotational molded articles, extruded articles and pultruded articles.

* * * * *